United States Patent

Hsieh

[11] Patent Number: 5,878,998
[45] Date of Patent: Mar. 9, 1999

[54] CONICAL SPRING

[76] Inventor: Frank Hsieh, 9th-1 Floor, Kuang Fu South Road, Taipei, Taiwan

[21] Appl. No.: 917,763

[22] Filed: Aug. 27, 1997

[51] Int. Cl.$^6$ .......................................................... F16F 1/06
[52] U.S. Cl. ........................................ 267/166.1; 267/180
[58] Field of Search ................................. 262/166, 166.1, 262/167, 168, 288, 289, 290

[56] References Cited

U.S. PATENT DOCUMENTS

| | | | |
|---|---|---|---|
| 359,359 | 3/1887 | Morris | 267/288 |
| 516,360 | 3/1894 | Turton | 267/166.1 |
| 653,155 | 7/1900 | Tilden | 267/180 |
| 2,086,321 | 7/1937 | Kudo | 267/288 |
| 2,649,298 | 8/1953 | Wulff etr al. | 267/166.1 |
| 3,300,042 | 1/1967 | Gordon | 267/166.1 |
| 3,862,751 | 1/1975 | Schwaller | 267/168 |
| 4,531,016 | 7/1985 | Duve | 267/180 |
| 4,735,403 | 4/1988 | Matsumoto et al. | 267/180 |
| 4,923,183 | 5/1990 | Saka | 267/180 |
| 5,425,531 | 6/1995 | Perraut | 267/166.1 |

*Primary Examiner*—Chris Schwartz
*Attorney, Agent, or Firm*—Browdy and Neimark

[57] ABSTRACT

A conical spring is formed by a steel wire, which is coiled into a series of rings in opposite directions. The wire is first coiled from the base thereof in one direction and in accordance with a predetermined rotating angle and is then coiled in a reverse direction according to a predetermined rotating angle.

1 Claim, 6 Drawing Sheets

CONICAL SPRING

FIELD OF THE INVENTION

The present invention relates generally to a spring, and more particularly to a conical spring.

BACKGROUND OF THE INVENTION

There are various springs, such as wire springs, flat springs, special springs, etc. The wire springs comprise the compression straight springs, the tension straight spring, the torsion spiral spring, the conical spring, and so forth.

The wire springs are generally the straight spring and the conical spring, as shown in FIGS. 1 and 2. Under the circumstance that the greatest stress of the straight spring does not exceed the elastic limit of the straight spring, the elasticity of the straight spring is eventually undermined after the prolonged use of the straight spring, as illustrated in FIG. 1.

As illustrated in FIG. 2, the conical spring is defective in design in that the base portion of the spring is caused to deform first when the conical spring is exerted on by a load, and that the midsegment and the top portion of the conical spring are subsequently caused to deform. As a result, the use of the conical spring can not be easily controlled.

SUMMARY OF THE INVENTION

The primary objective of the present invention is to provide a conical spring capable of overcoming the shortcomings of the prior art springs described above.

The foregoing objective of the present invention is attained by a conical spring, which is formed by a wire which is coiled into a series of rings in opposite directions. The wire is first coiled from the base thereof in one direction and in accordance with a predetermined rotating angle and is then coiled in a reverse direction according to a predetermined rotating angle.

DETAILED DESCRIPTION OF THE INVENTION

Figure 1:
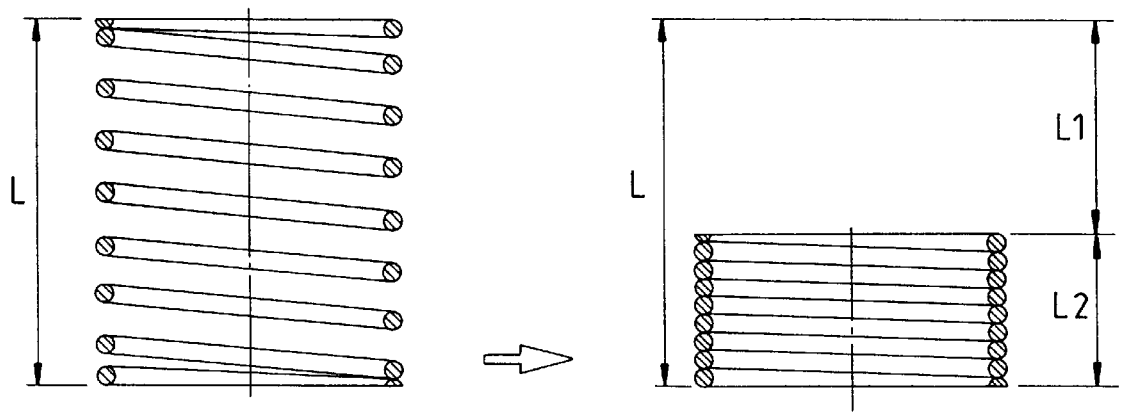
FIG. 1 shows a schematic view of a prior art straight spring at work.
Figure 2:
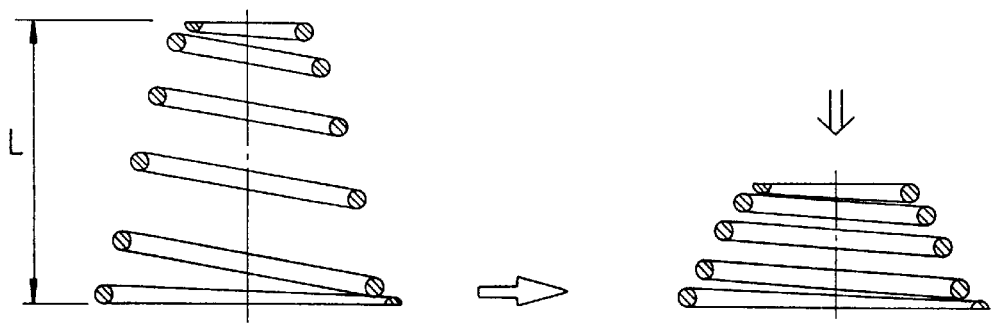
FIG. 2 shows a schematic view of a prior art conical spring at work.
Figure 3:
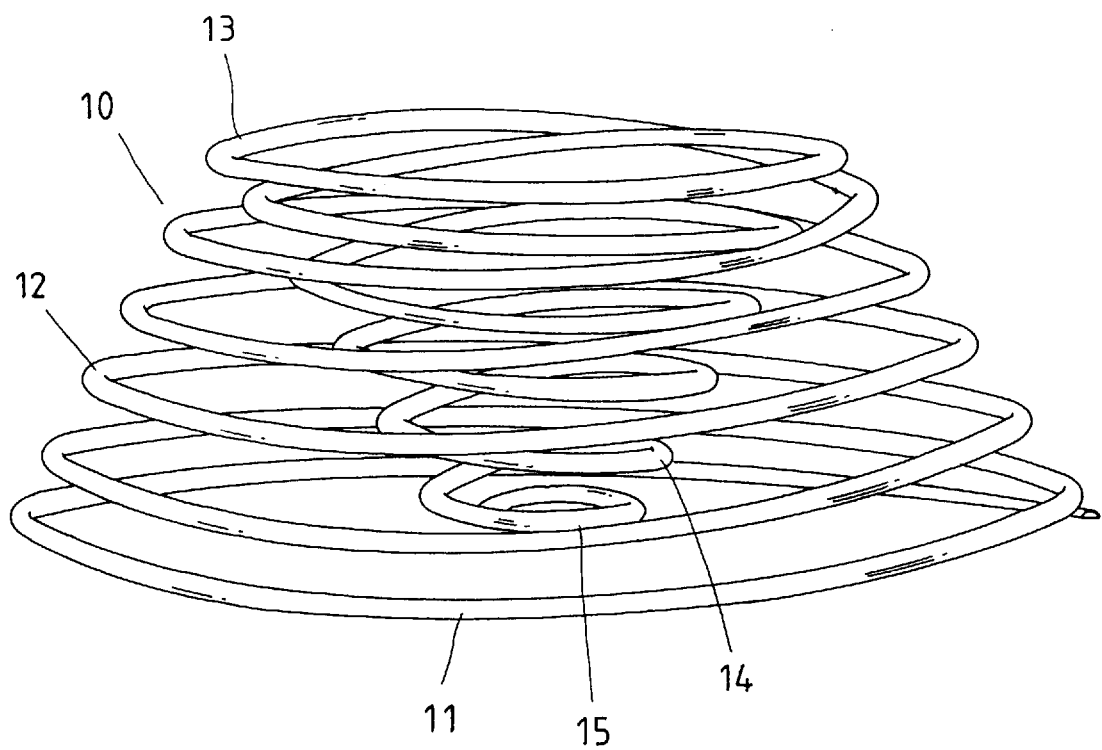
FIG. 3 shows a perspective view of a conical spring of a first preferred embodiment of the present invention.
Figure 4:
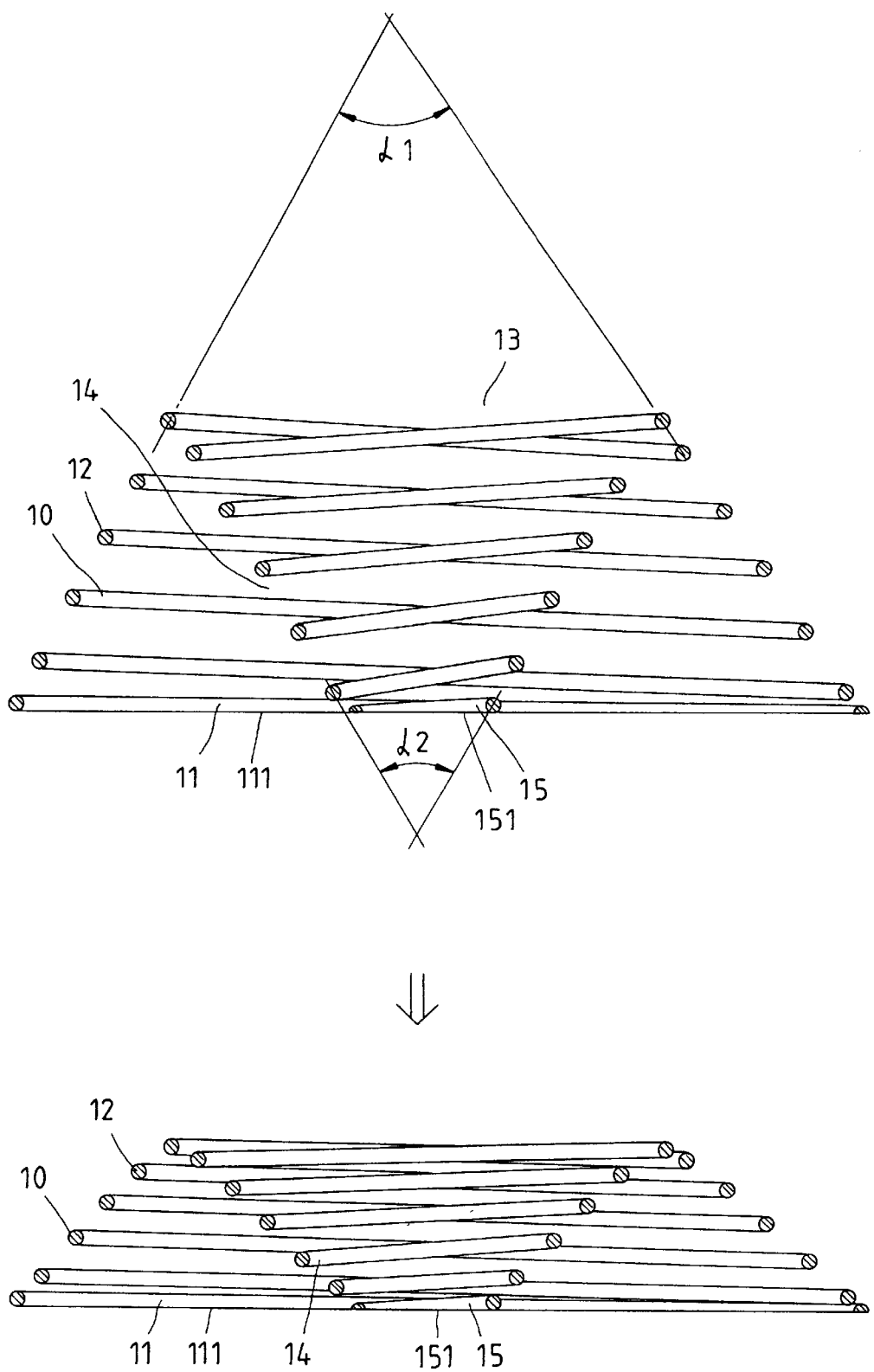
FIG. 4 shows a schematic view of the conical spring of the first preferred embodiment of the present invention at work.
Figure 5:
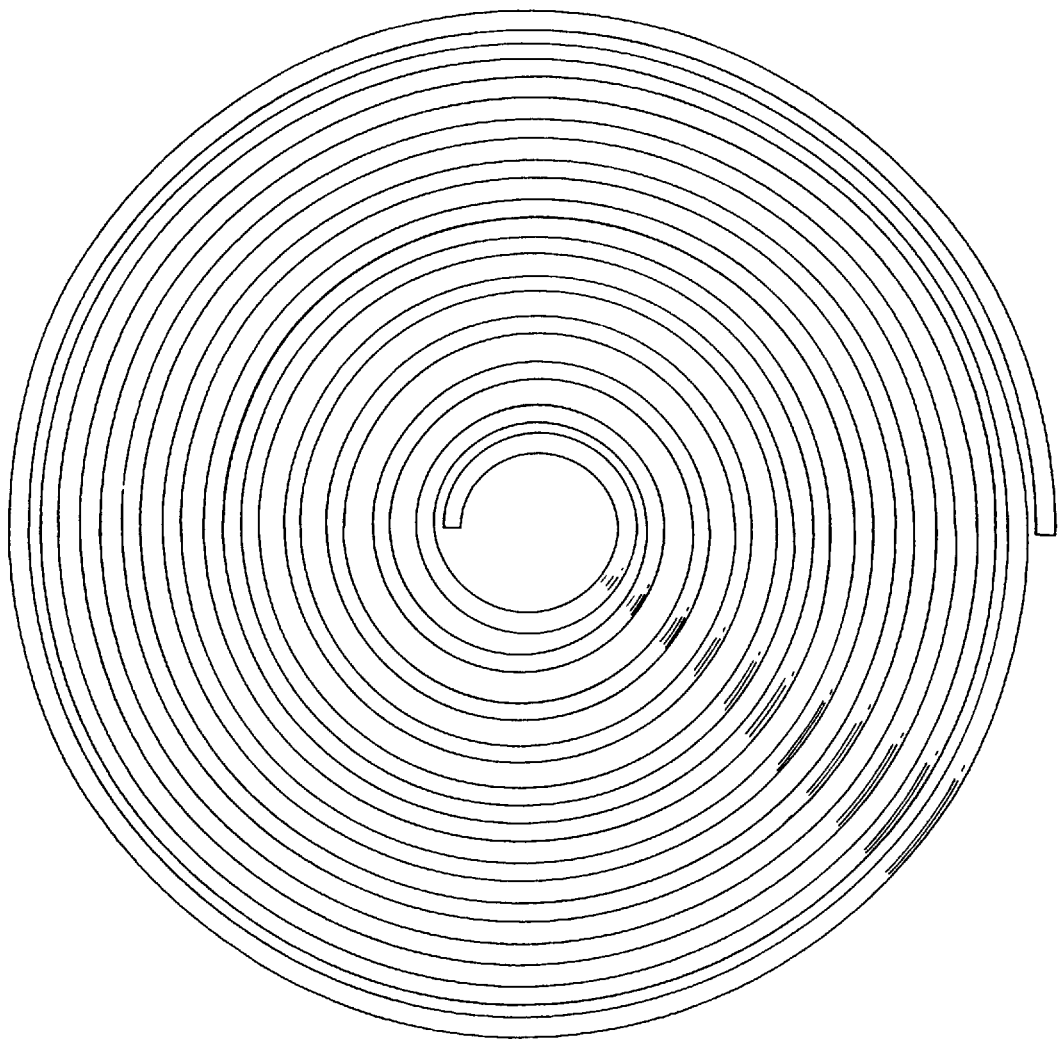
FIG. 5 shows a top view of the first preferred embodiment of the present invention.

As shown in FIGS. 3–5, a conical spring of the first preferred embodiment of the present invention is formed by a wire 10 of a steel material, which is first coiled into a series of rings from a first level 111 of a base 11 thereof such that a predetermined vertex angle $\alpha 1$ is formed, and that a first conical body 12 is formed. The first coiling of the wire 10 is terminated at a predetermined second level 13 before the wire 10 is coiled into a series of rings in reverse direction such that a second conical body 14 is formed by a vertex 15 having a third level 151 which is almost at the same level as the first level 111. The second conical body 14 has a predetermined vertex angle $\alpha 2$.

When the conical spring is exerted on by a load, the first conical body 12 and the second conical body 14 of the conical spring are caused to deform uniformly in view of the fact that the first conical body 12 and the second conical body 14 are arranged in an inverted manner. The working mechanism of the conical spring of the present invention can be expressed by an equation as follows:

$$W = \pi d^3 \tau / 16 r_1 + \pi d^3 \tau / 16 r_2,$$

in which W stands for the maximum load; d, the diameter of the wire; $\tau$, the maximum shearing stress; $r_1$, the radius of the first base 11 of the first conical body 12; $r_2$, the radius of the second level 13 of the second conical body 14.

It is therefore readily apparent that the conical spring of the present invention has an excellent elasticity and a large compression space, and that the series of rings of the first conical body 12 and the second conical body 14 are prevented from obstruction one another, and further that the conical spring of the present invention has a uniform elasticity, which is made possible by the first conical body 12 having a natural length equal to the natural length of the second conical body 14, and still further that the conical spring of the present invention may be formed of a plurality of conical bodies.

Figure 6:
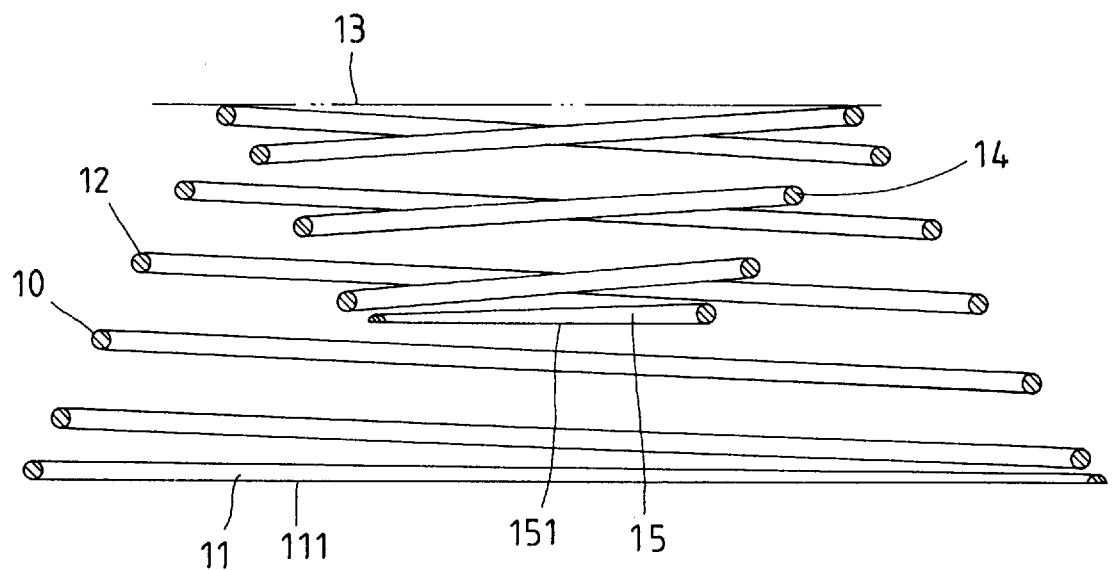
FIG. 6 shows a sectional view of a second preferred embodiment of the present invention.
Figure 7:
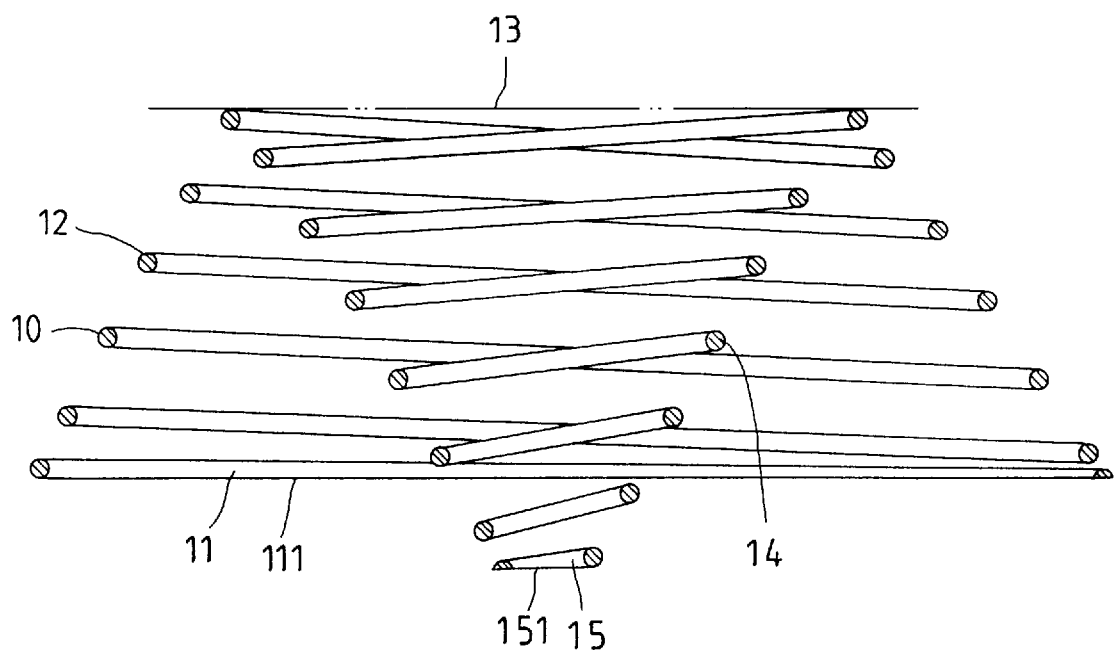
FIG. 7 shows a sectional view of a third preferred embodiment of the present invention.
Figure 8:
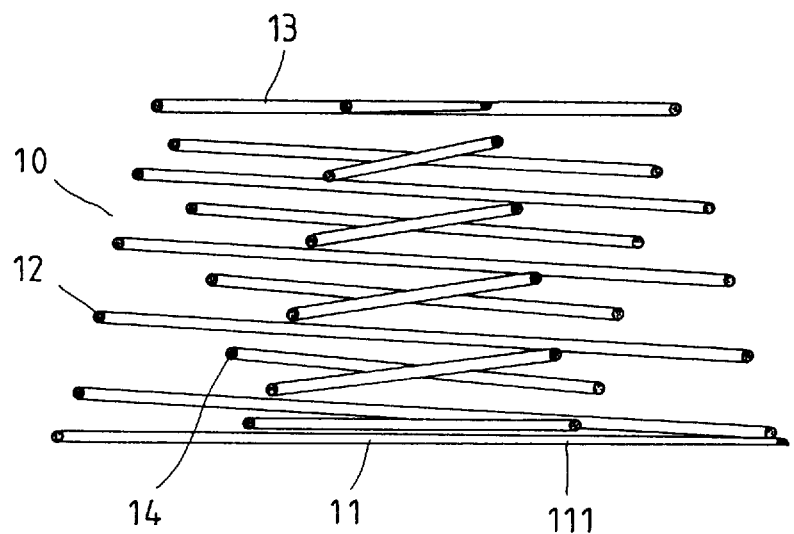
FIG. 8 shows a sectional view of a fourth preferred embodiment of the present invention.
Figure 9:
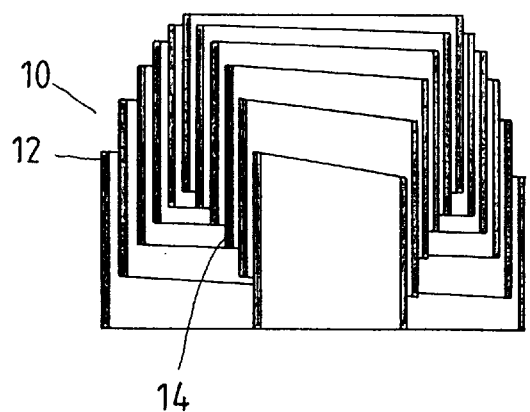
FIG. 9 shows a sectional view of a fifth preferred embodiment of the present invention.

The embodiment of the present invention described above is to be regarded in all respects as being merely illustrative and not restrictive. Accordingly, the present invention may be embodied in other specific forms without deviating from the spirit thereof. For example, the conical spring of the present invention may be formed of a second conical body 141 having a third level 151 which may be located at a level which is either higher or lower than the first level 111 of the first conical body 12, as shown in FIGS. 6 and 7. In addition, the first conical body 12 and the second conical body 14 may have different natural lengths so as to enable the conical spring of the present invention to have an optimum loading effect. The present invention may be further embodied in other forms, as shown in FIGS. 8 and 9. The conical spring of the present invention may be formed of three conical bodies, with the third conical body being formed by a series of rings which are formed by the coiling of the wire 10 from the third level 151 of the second conical body 14. The wire 10 of the conical spring of the present invention may be round, square, or oval in its cross section. Moreover, the wire 10 may be replaced with an elongated strip of a steel material. The present invention is therefore to be limited only by the scopes of the following appended claims.

What is claimed is:

1. A conical spring formed of a wire of a steel material, said wire having a cross-section and being coiled in one direction into a series of rings from a first level of a first base of said wire to form a first conical body having a first predetermined vertex angle and terminating at a second level from which said wire is coiled in a second direction reverse to said one direction into a another series of rings to form a second conical body terminating at a vertex having a third level, said second conical body having a second predetermined vertex angle;

wherein said wire is coiled in reverse from said second direction to said third level of said second conical body into a third series of rings to form a third conical body.

* * * * *